(12) United States Patent
Johnson et al.

(10) Patent No.: US 8,994,613 B1
(45) Date of Patent: Mar. 31, 2015

(54) USER-EXPERIENCE CUSTOMIZATION

(76) Inventors: Michael Johnson, Mountain View, CA (US); Joshua Weaver, Mountain View, CA (US); Thad Starner, Mountain View, CA (US)

( * ) Notice: Subject to any disclaimer, the term of this patent is extended or adjusted under 35 U.S.C. 154(b) by 451 days.

(21) Appl. No.: 13/345,493

(22) Filed: Jan. 6, 2012

(51) Int. Cl.
  *G09G 5/00* (2006.01)
  *G06F 3/041* (2006.01)
  *G09G 5/37* (2006.01)

(52) U.S. Cl.
  CPC ........................................ *G09G 5/37* (2013.01)
  USPC ............................................... 345/8; 345/178

(58) Field of Classification Search
  USPC ............................................. 345/8, 173, 178
  See application file for complete search history.

(56) References Cited

U.S. PATENT DOCUMENTS

| | | | |
|---|---|---|---|
| 7,073,129 B1 * | 7/2006 | Robarts et al. | 715/740 |
| 2007/0104369 A1 | 5/2007 | Weatherhead | |
| 2009/0164132 A1 * | 6/2009 | Jung et al. | 702/19 |
| 2009/0238378 A1 | 9/2009 | Kikinis et al. | |

OTHER PUBLICATIONS

LAFCam—Leveraging Affective Feedback Camcorder, Andrea Lockerd and Florian Mueller, CHI Extended Abstracts, pp. 574-575. ACM, (2002).
KDDI's mind-reading Android app monitors your brainstorms, or lack thereof . . . (video) [online], Jul. 18, 2011 [retrieved Jul. 19, 2011]. Retrieved from the Internet<URL: http://www.engadget.com/2011/07/18/kddis-mind-reading-android-app-monitors-your-brainstorms-or-la/>.

\* cited by examiner

*Primary Examiner* — Michael Faragalla (57) ABSTRACT

Methods and systems for customizing user-experience of media content and providing content of interest to a user are provided. A computing device, such as a wearable user device having a head-mounted display (HMD) may receive media content and physiological data associated with a user experiencing the media content. The received physiological data may include one of a pupillary response, a galvanic skin response, an electrocardiographic response, an electroencephalographic response, a body temperature response, or a blood pressure response. The computing device may determine a portion of the media content which corresponds to the physiological data, and accordingly search for content of interest to the user. The content of interest may then be provided to the user, thereby customizing the user-experience of the user. The content of interest to the user may be displayed on a display of the wearable user device.

19 Claims, 6 Drawing Sheets

USER-EXPERIENCE CUSTOMIZATION

BACKGROUND

Unless otherwise indicated herein, the materials described in this section are not prior art to the claims in this application and are not admitted to be prior art by inclusion in this section.

Various technologies can be utilized to display information to a user of a computing system. Some systems for displaying information may utilize a screen (such as a liquid crystal display (LCD) screen or plasma display screen) integrated into a portable device such as a mobile phone or audio playback device that can be moved, on demand, into a position by a user at which the screen is viewable. Other systems for displaying information continuously to a user may utilize head-mounted displays. A head-mounted display can be incorporated into a pair of goggles, glasses, a headband, a helmet, or other such device that the user can wear. A head-mounted display is typically positioned near the user's eyes and calibrated and/or aligned to the user's field of view to allow the user to review displayed information with little or no head movement. The display may also be transparent or translucent, allowing the user to view and interact with the surrounding environment while wearing the head-mounted display. In some cases, the display may not be transparent, but may project a captured image of the environment on the display to simulate transparency or translucency. In other cases, the display may be formed directly on a user's retina via a low-powered laser scanning technique. To generate display information such as images and text for display, a computer processing system may be used. Such head-mounted displays have a variety of applications, such as aviation information systems, vehicle navigation systems, information display/interaction, social networking, and video games, among others.

For example, in aviation information systems, display information may include airspeed, altitude, a horizon line, heading, turn/bank, and slip/skid indicators. Display information may also include aviation data and symbols for use in approaches and landings. For example, a flight guidance system in the head-mounted display can provide visual cues based on navigation aids such as an Instrument Landing System or augmented Global Positioning System. Other aviation uses are possible as well. In the automotive field, display information may include speedometer, tachometer, and navigation system displays. Additionally, night vision information may be displayed to aid in night driving. Other automotive uses are possible as well.

As more and more applications and uses are being developed for head-mounted display devices, and computing systems in general, more complex interactions have arisen. For example, in the aviation context, a pilot may need to interface with the information being displayed in the head-mounted display, perhaps to switch between a parameter display interface (e.g., displaying airspeed, altitude, a horizon line, heading, etc.) and an approach/landing display interface.

Other, more complex interactions may also be necessary. For example, a pilot may wish to interact with other pilots in the sky and/or send information to one or more selected pilots, or a driver may wish to interact with other drivers on the road or other passengers in the car. Current solutions, such as buttons, are limited in their functionality, and generally increase bulk, block light, and/or reduce peripheral vision due to their size, location, and composition requirements.

SUMMARY

In one example embodiment, a method is provided that comprises receiving, at a computing device, first media content that is indicative of a user-experience associated with the computing device, wherein the user-experience comprises second media content from an external media device, receiving physiological data indicating a physiological state, wherein the physiological data is received from one or more physiological sensors, in response to receiving the physiological data indicating the physiological state, analyzing the first media content to determine a portion of the second media content that corresponds to the physiological state, using the portion of the second media content that corresponds to the physiological state as a basis for initiating a search for content of interest, and displaying the content of interest at the computing device.

In another example embodiment, a method is provided that comprises receiving, at a server system, first media content that is indicative of a user-experience associated with a computing device, wherein the user-experience comprises second media content from an external media device, receiving, at the server system, physiological data associated with the computing device, wherein, wherein the physiological data is indicative of a physiological state, in response to receiving the physiological data indicating the physiological state, analyzing the first media content to determine a portion of the second media content that corresponds to the physiological state, using the portion of the second media content that corresponds to the physiological state as a basis for initiating a search for content of interest, and sending the content of interest to the computing device.

In another example embodiment, a non-transitory computer readable medium with instructions stored thereon is provided. The instructions may be executable by a computing device to cause the computing device to perform functions. The functions comprise receiving, at a computing device, first media content that is indicative of a user-experience associated with the computing device, wherein the user-experience comprises second media content from an external media device, receiving physiological data indicating a physiological state, wherein the physiological data is received from one or more physiological sensors, in response to receiving the physiological data indicating the physiological state, analyzing the first media content to determine a portion of the second media content that corresponds to the physiological state, using the portion of the second media content that corresponds to the physiological state as a basis for initiating a search for content of interest, and displaying the content of interest at the computing device.

In another example embodiment, a non-transitory computer readable medium with instructions stored thereon is provided. The instructions may be executable by a computing device to cause the computing device to perform functions. The functions comprise receiving, at a server system, first media content that is indicative of a user-experience associated with a computing device, wherein the user-experience comprises second media content from an external media device, receiving, at the server system, physiological data associated with the computing device, wherein, wherein the physiological data is indicative of a physiological state, in response to receiving the physiological data indicating the physiological state, analyzing the first media content to determine a portion of the second media content that corresponds to the physiological state, using the portion of the second media content that corresponds to the physiological state as a basis for initiating a search for content of interest, and sending the content of interest to the computing device.

In yet another example embodiment, a device is provided. The device includes a processor and memory. The memory has instructions stored therein executable by the processor to perform functions. The performed functions comprise receiving, at a computing device, first media content that is indicative of a user-experience associated with the computing device, wherein the user-experience comprises second media content from an external media device, receiving physiological data indicating a physiological state, wherein the physiological data is received from one or more physiological sensors, in response to receiving the physiological data indicating the physiological state, analyzing the first media content to determine a portion of the second media content that corresponds to the physiological state, using the portion of the second media content that corresponds to the physiological state as a basis for initiating a search for content of interest, and displaying the content of interest at the computing device.

In yet another example embodiment, another device is provided. The device includes a processor and memory. The memory has instructions stored therein executable by the processor to perform functions. The performed functions comprise receiving, at a server system, first media content that is indicative of a user-experience associated with a computing device, wherein the user-experience comprises second media content from an external media device, receiving, at the server system, physiological data associated with the computing device, wherein, wherein the physiological data is indicative of a physiological state, in response to receiving the physiological data indicating the physiological state, analyzing the first media content to determine a portion of the second media content that corresponds to the physiological state, using the portion of the second media content that corresponds to the physiological state as a basis for initiating a search for content of interest, and sending the content of interest to the computing device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION OF THE FIGURES

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein. Further, other embodiments may be utilized, and other changes may be made, without departing from the scope of the subject matter presented herein Furthermore, reference is made herein to the accompanying figures, which form a part hereof. In the figures, similar symbols typically identify similar components, unless context dictates otherwise. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

In an exemplary scenario, a user wearing a head-mounted display (HMD) may be experiencing media content such as watching a movie or a television program. The HMD may include a video camera which may be configured to capture multimedia video from a point of view of the user wearing the HMD. In this case, the HMD video camera may capture a multimedia video including the media content the user is experiencing.

The HMD may also include one or more physiological sensors in contact with the user wearing the HMD. Physiological data collected from the user may be used to determine the physiological state of the user. For example, a galvanic skin response may indicate a degree of engagement of the user.

The physiological data and the multimedia video captured by the HMD video camera may be correlated to determine the user's physiological response to the media content the user is experiencing. For example, the galvanic skin response of the user may indicate that the user is engaged when a certain actor appears in the captured multimedia video, indicating that the user has a fondness for the certain actor.

The indication that the user has a fondness for the certain actor may be used for customizing the media experience of the user. For example, a search may be performed to find additional information about the certain actor, and the additional information found in the search may then be presented to the user on the HMD at an appropriate time, such as during a commercial break.

2. Wearable Head-Mounted Display Device and Systems

Figure 1:
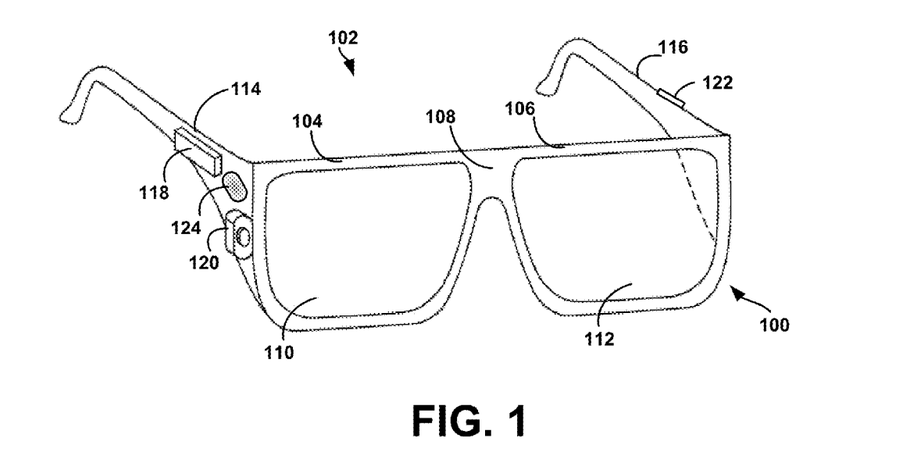
FIG. 1 illustrates an example system for receiving, transmitting, and displaying data.

FIG. 1 illustrates an example system 100 for receiving, transmitting, and displaying data. The system 100 is shown in the form of a wearable computing device. While FIG. 1 illustrates a head-mounted display (HMD) 102 as an example of a wearable computing device, other types of wearable computing devices could additionally or alternatively be used. As illustrated in FIG. 1, the HMD 102 comprises frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or HMD where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera and microphone 120 is shown positioned on the extending side-arm 114 of the HMD 102; however, the video camera 120 may be provided on other parts of the HMD 102. The video camera 120 may be configured to capture a multimedia video. As such, the video camera may include a microphone configured to capture an audio component of the multimedia video, accompanying the captured video component. In one example, the microphone may be configured to capture an audio-only media content without an accompanying video component. In another example, the video camera may be configured to capture a video-only media content without accompanying audio component. The video camera 120 may further be configured to capture images at various resolutions or at different frame rates and audio signals at different sampling rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user. Similarly, additional microphones may also be used to capture audio components of the multimedia video at different ranges.

The sensor 122 is shown on the extending side-arm 116 of the HMD 102; however, the sensor 122 may be positioned on other parts of the HMD 102. The sensor 122 may include one or more of a gyroscope or an accelerometer, for example. Other sensing devices may be included within, or in addition to, the sensor 122 or other sensing functions may be performed by the sensor 122. In one example embodiment, the sensor 122 may include one or more physiological sensors. In another example embodiment, the sensor 122 may include an eye-tracking sensor, which may be configured to determine the aim or focus of the eyes of the user wearing the HMD 102. In yet another example embodiment, the sensor 122 may include peripheral sensors in communication with the HMD 102 via wired or wireless communication, such as a heart-rate monitor strap to be worn on the torso of the user of the HMD 102.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
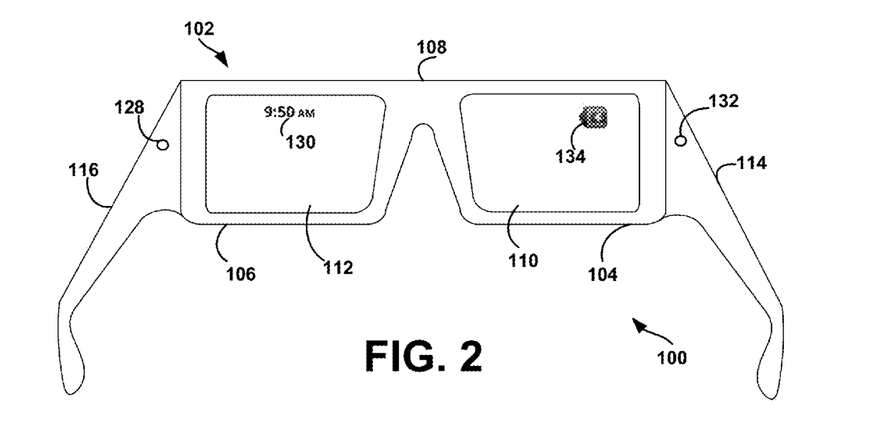
FIG. 2 illustrates an alternate view of the system illustrated in FIG. 1.

FIG. 2 illustrates an alternate view of the system 100 illustrated in FIG. 1. As shown in FIG. 2, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent, substantially transparent, or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 3A:
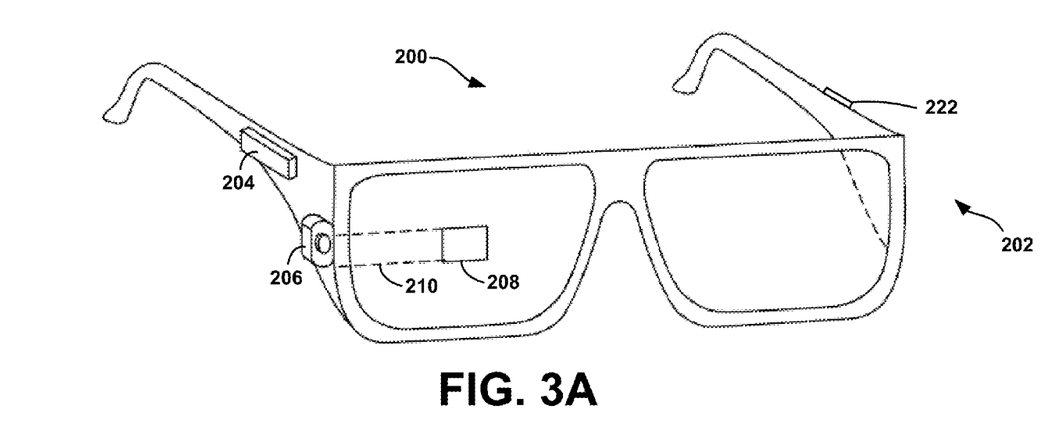
FIG. 3A illustrates an example system for receiving, transmitting, and displaying data.

FIG. 3A illustrates an example system 200 for receiving, transmitting, and displaying data. The system 200 is shown in the form of a head-mounted display (HMD) 202. The HMD 202 may include frame elements and side-arms such as those described with respect to FIGS. 1 and 2. The HMD 202 may additionally include an on-board computing system 204, a video camera 206, and a sensor 222 such as those described with respect to FIGS. 1 and 2. The video camera 206 is shown mounted on a frame of the HMD 202; however, the video camera 206 may be mounted at other positions as well. As discussed above, in one embodiment, the sensor 222 may include one or more physiological sensors capable of detecting physiological signals from a user wearing the HMD 202. In another example embodiment, the sensor 222 may also include an eye-tracking sensor, which may be configured to determine the aim or focus of the eye of the user wearing the HMD 202. In yet another example embodiment, the sensor 122 may include peripheral sensors in communication with the HMD 102 via wired or wireless communication, such as a heart-rate monitor strap to be worn on the torso of the user of the HMD 102.

As shown in FIG. 3A, the HMD 202 may include a single display 208 which may be coupled to the device. The display 208 may be formed on one of the lens elements of the HMD 202, such as a lens element described with respect to FIGS. 1 and 2, and may be configured to overlay computer-generated graphics in the user's view of the physical world. The display 208 is shown to be provided in a center of a lens of the HMD 202, however, the display 208 may be provided in other positions. The display 208 is controllable via the computing system 204 that is coupled to the display 208 via an optical waveguide 210.

Figure 3B:
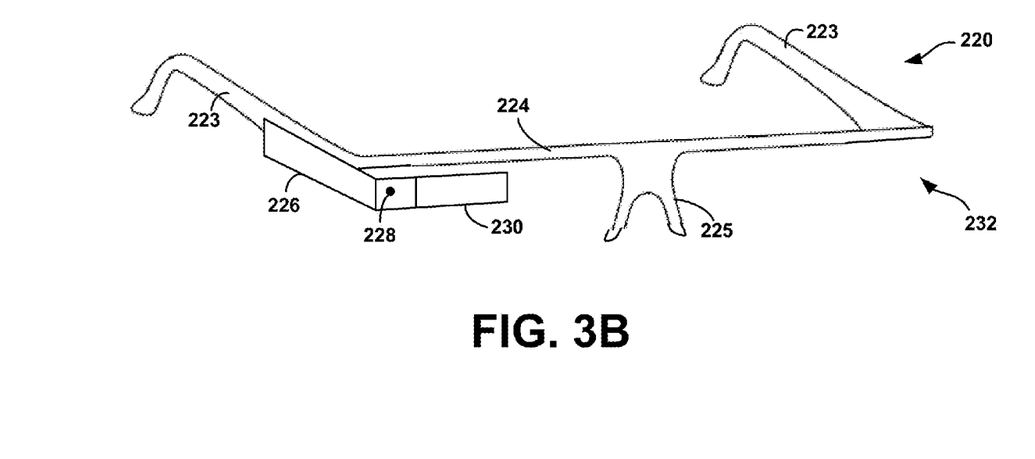
FIG. 3B illustrates an example system for receiving, transmitting, and displaying data.

FIG. 3B illustrates an example system 220 for receiving, transmitting, and displaying data. The system 220 is shown in the form of a wearable computing device 232. The wearable computing device 232 may include side-arms 223, a center frame support 224, and a bridge portion with nosepiece 225. In the example shown in FIG. 3B, the center frame support 224 connects the side-arms 223. The wearable computing device 232 does not include lens-frames containing lens elements. The wearable computing device 232 may additionally include an on-board computing system 226 and a video camera 228, such as those described with respect to FIGS. 1 and 2.

The wearable computing device 232 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 232 is worn by a user. For example, the single lens element 230 may be positioned below the center frame support 224, as shown in FIG. 3B.

Figure 4:
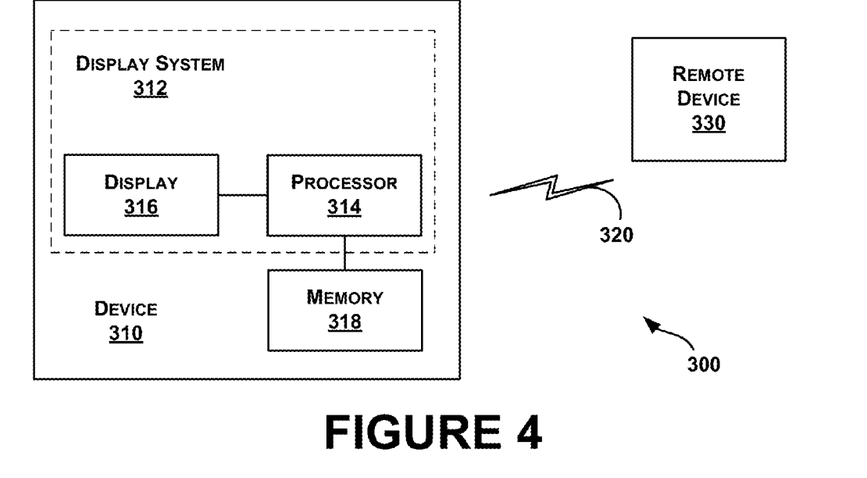
FIG. 4 illustrates a schematic drawing of an example computer network infrastructure.

FIG. 4 illustrates a schematic drawing of an example computer network infrastructure. In the computer network infrastructure 300 of FIG. 4, a device 310 communicates using a communication link 320 (e.g., a wired or wireless connection) to a remote device 330. The device 310 may be any type of device that can receive data and display information corresponding to or associated with the data. In an exemplary embodiment, the device 310 may be a wearable computing system having an HMD, such as the HMDs 102, 200, or 220 described with reference to FIGS. 1-3B.

Thus, the device 310 may include a display system 312 comprising a processor 314 and a display 316. The display 310 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, or tablet computing device, etc., that is configured to transmit data to the device 310. The remote device 330 may further be a network of computing devices and servers, sometimes referred to as "the cloud." The remote device 330 and the device 310 may contain hardware to enable the communication link 320, such as processors, transmitters, receivers, antennas, etc.

In FIG. 4, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 5:
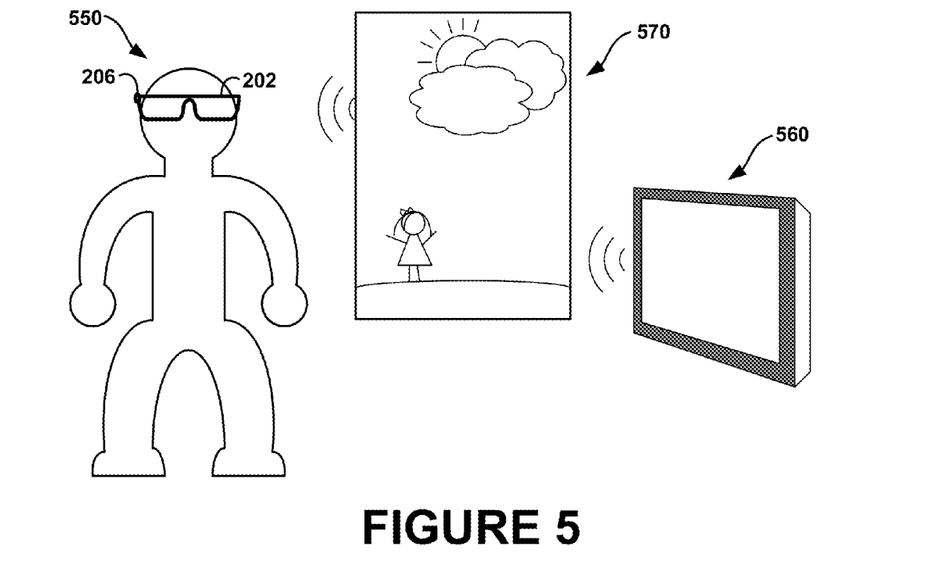
FIG. 5 illustrates an exemplary environment of a user experiencing media content.

3. User-Experience Customization Using the Wearable Head-Mounted Display System FIG. 5 illustrates an exemplary scenario with a user 550 experiencing media content provided through a media device 560, in accordance with an exemplary embodiment. In the exemplary scenario, the user 550 may also be experiencing environmental content from the surrounding environment 570. As such, an overall user-experience of user 550 may include both the media content provided through the media device 560 and the environmental content from the surrounding environment 570. In one example, the user 550 may perceive the overall user-experience while the user 550 is wearing a head-mounted display (HMD), such as the HMD 202 of FIG. 3A. In an exemplary embodiment, the HMD 202 may include a substantially transparent display, so that the user can view a television or computer monitor, for instance, through the HMD's display.

In another exemplary embodiment, the HMD 202 may be configured to determine the overall user-experience that the user 550 is experiencing by capturing multimedia video from the point of the view of the user 550 using a video camera 206 included on the HMD 202. In yet another exemplary embodiment, the HMD 202 may include one or more physiological sensors for acquiring physiological data from the user 550.

In one example, the HMD 202 may acquire physiological data from the user 550 while the user 550 is experiencing media content from the media device 560. In this case, the physiological data from the user 550 may be correlated with the multimedia video captured by the HMD to determine a portion of the media content from the media device 560 which corresponds to a physiological state of the user 550, as indicated by the physiological data.

Once a portion of the media content from the media device 560 is correlated to a physiological state of the user 550, a search can be performed based on the portion of the correlated media content to find content of interest to the user 550. The content of interest may then be provided to the HMD for display to the user, thereby customizing the media content experience of the user 550.

Figure 6:
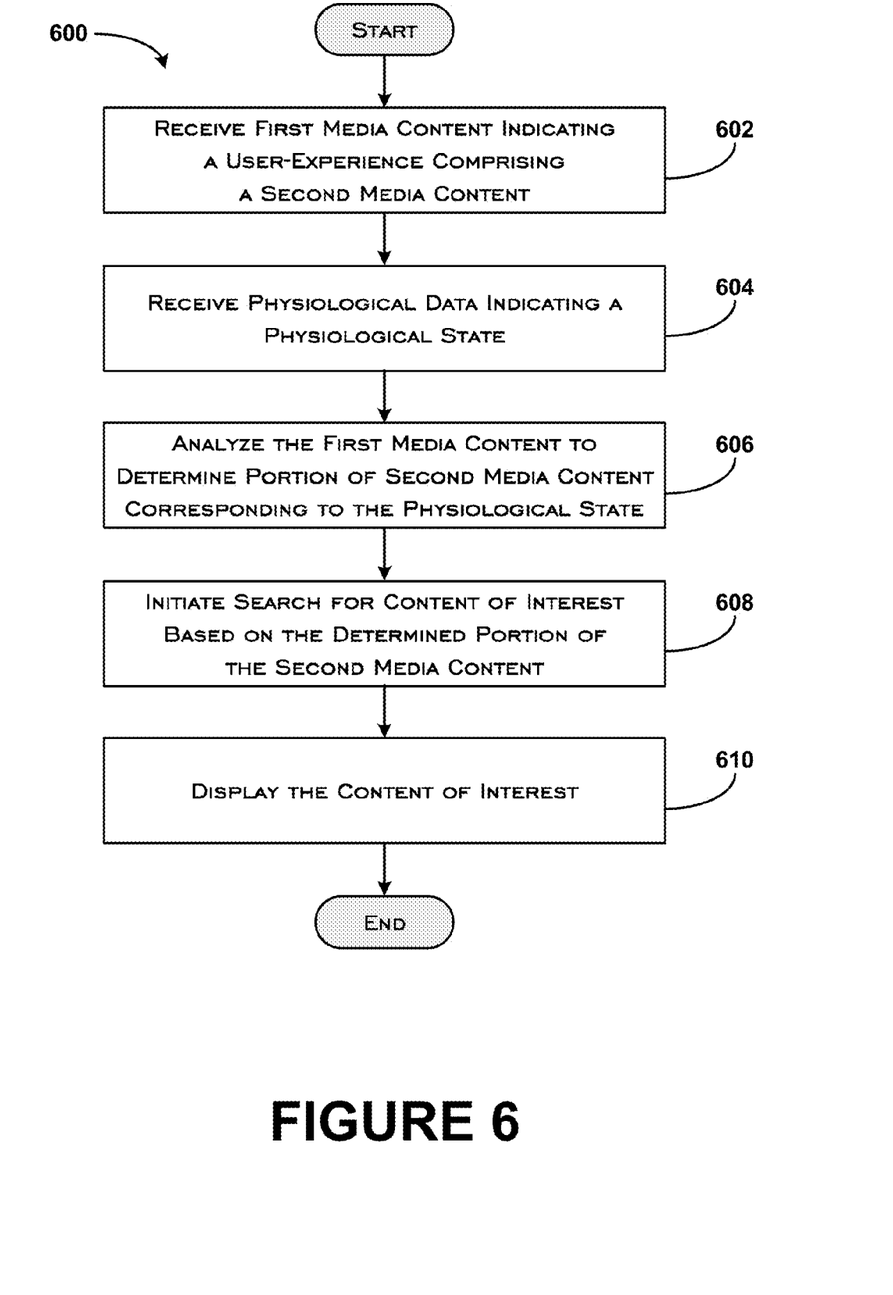
FIG. 6 is a block diagram of an exemplary method for customizing a user experience.

FIG. 6 is a block diagram of an exemplary method 600 for customizing a user experience, according to one embodiment of the present application. Method 600 could be executed by the HMD 202 of FIG. 2, the device 310 of FIG. 4, or another device or system altogether. Method 600 may include one or more operations, functions, or actions as illustrated by one or more of blocks 602-610. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 602, the method 600 includes receive first media content indicating a user-experience. In one example, the user-experience comprises a second media content, which may be from an external media device.

For instance, the first media content may be a multimedia video having audio and video components showing the overall experience of the user 550, including portions of media content from the media device 560 and portions of environmental content from the surrounding environment 570. As discussed above, the video camera 206 of HMD 202 may capture this multimedia video from the point of view of the user 550, thereby providing the first media content which indicates the user-experience of user 550. The captured multimedia video may include portions of the media content from the media device 560 while the user 550 is experiencing the media content from the media device 560. In this case, the second media content included in the first media content may be portions of the media content from the media device 560 captured by the video camera 206 while the user 550 is experiencing the media content from the media device 560. In this example, the media device 560 providing the second media content may be an external media device, such as multi-media entertainment center.

In another example, the first media content may be a multimedia video of a live event, such as a theater production, or a music concert. In this case, the second media content may be content provided on the stage of the theater or concert venue. In yet another example, the first media content may be a multimedia video showing the user 550 browsing the internet on a computing device, such as a personal computer or mobile device. In this case, the second media content may be content provided on the display of the computing device.

At block 604, the method 600 involves receiving physiological data indicating a physiological state. Various types of sensors or combinations of sensors may be configured to acquire physiological data from the user 550. In an exemplary embodiment, a sensor may acquire physiological data from the user 550 by detecting physiological quantities at the point of contact between the sensor and the user 550, and convert the detected physiological quantities into physiological signals that can be stored and transmitted as physiological data. Given that a physiological state of the user 550 may be revealed through the detected physiological quantities, the physiological data may therefore indicate a physiological state of the user 550.

Accordingly, block 604 may involve the HMD 202 receiving physiological data from the sensor 222. The sensor 222 may have a variety of physiological sensors configured to detect at least one of a galvanic skin response, an electrocardiographic response, an electroencephalographic response, a body temperature response, a blood pressure response, and a hemoglobin oxygenation response. In an exemplary embodiment, the HMD 202 may further include an additional video camera or image capturing device aiming at the eyes of the user 550 and configured to detect a pupillary response of the user 550. In this case, the pupillary response involves dilations or contractions of pupils and may indicate interest in or engagement with a subject of attention. As mentioned above, the sensor 222 may further include a peripheral sensor in contact with the user 550 and in communication with the HMD 102 via wired or wireless communication. In one example, a sensor configured to detect electrocardiographic responses may provide better response detection if in contact with a torso of the user 550 rather than a head of the user 550. In this case, the sensor 222 may be an electrocardiographic response sensor in contact with the torso of user 550 and in communication with the HMD 102. In a further example, the sensor 222 may include some sensors integral to the HMD 102 (such as sensors for detecting electroencephalographic responses) and some peripheral sensors (such as sensors for detecting electrocardiographic response).

Changes in physiological states of the user 550, such as an increased electrocardiographic response (i.e., faster heart rate) for example, may indicate excitement, fear, or another mental and/or physiological state. In another example, an increase in body temperature response may indicate that the user is in an engaged or excited state. As such, receiving physiological data indicating a variety of different physiological responses may provide additional data to determine physiological states that may be more complex. For instance, when the user 550 is enjoying a horror film, the physiological state of the user 550 may not simply indicate fear, but rather a blend of fear and excitement.

In reference to the exemplary scenario of FIG. 5, the physiological states of the user 550 during the user-experience indicated by the received first media content may correlate to the second media content included in the first media content. At block 606, the method 600 includes analyze the first media content to determine a portion of the second media content corresponding to the physiological state. In one example, this analysis is performed in response to receiving the physiological data indicating the physiological state at block 604.

In one instance, analyzing the first media content may include synchronizing the received first media content with the received physiological data, such that changes in the physiological states of the user 550 may be mapped to portions of the first media content. In some cases, a delay may exist between an event captured in the first media content and when a physiological state of the user 550 may change in response to the event. The length of the delay may vary by the type of physiological response being detected. In one example, the delay for a galvanic skin response may be two seconds. As such, the delay may be accounted for when mapping the changes in physiological state of user 550 to portions of the first media content. The portions of the first media content mapped to changes in the physiological states of the user 550 may further include portions of the second media content. In other words, the first media content may indicate that the user 550 is experiencing the second media content provided by the media device 560 when the physiological state of the user changes.

For example, the first media content may be a video captured by the video recorder 206 while the user 550 is enjoying the second media content, which may be a movie provided by the media device 560. The first media content may therefore include a view of a display of the media device 560 providing the second media content. In this case, a change in the physiological state of the user 550 coinciding with a certain activity occurring in the second media content may indicate that the change in physiological state of the user 550 correlates to the certain activity occurring in the second media content. This may be the case of the user 550 being engaged when a certain actor appears on the screen of the media device 560 providing the second media content, or the case of the user 550 being frightened when something terrifying happens on the screen of the media device 560 providing the second media content.

In a further example, the second media content may be an action film, and a change in the physiological state of the user 550 may coincide with a portion of the action film which is a car-chase scene. In this instance, the change in the physiological state of the user 550 may correspond with the portion of the second media content which is the car-chase scene, and may further indicate that the change in the physiological state of the user 550 is a result of the user 550 experiencing the portion of the second media content which is the car-chase scene.

Correlating the change in the physiological state of the user 550 with a portion of the media content which is the car-chase scene may indicate that the user 550 is enjoying the portion of the media content which is the car-chase scene. In this case, the enjoyment of the user 550 may indicate the user 550 enjoys car-chase scenes in general. However, the enjoyment of the user 550 may also indicate that the user enjoys specific elements often involved in a car-chase scene, such as vehicles moving at high speeds, or fast-paced thumping music, rather than car-chase scenes in general.

Since several events may be occurring at the same time on the screen of the media device 560 providing the second media content, as may be the case with the car-chase scene, additional analysis may be performed to determine a portion of the second media content that corresponds to the physiological state of the user 550. In this case, analyzing one or more associations between previously received physiological data and previously received media content may provide additional data for determining the physiological reaction of the user to car-chase scenes, or elements of car-chase scenes.

In one example, previously received physiological data and media content indicating previous media content experiences of the user 550 may include records of media content the user 550 has experienced and the physiological data associated with the media content. In one case, the previously received physiological data and media content indicating previous media content experiences of the user 550 may include raw physiological data corresponding to portions of previously experienced media content. In this case, the previously received raw physiological data may be mapped against the received physiological data to determine the physiological state of the user and further determine a portion of the second media content corresponding to the physiological state of the user 550. In one instance, a curve-matching algorithm may be implemented to match the physiological state of the user 550 with physiological states of the user 550 associated with the previously received media content. Since the curve-matching algorithms as related to physiological data are well known in the art, details of the algorithms are not discussed in detail here.

In another case, the records of media content and associated physiological data may also include information indicating previously determined portion of media content the user 500 responds physiologically to. For instance, the user may have exhibited a specific physiological state in response to a particular actor in the past, according to previously experienced media content and the associated physiological data. In this instance, the particular actor may be correlated to a physiological state of the user 550, such that when the user 550 exhibits the physiological state correlated to the particular actor, and the actor is present in the second media content, the portion of the second media content corresponding to the physiological state of the user 550 is likely the particular actor. Further, the correlation between the physiological state of the user and the particular actor may be updated and refined as the user 550 experiences more media content with or without the actor while exhibiting the physiological state.

In another case, the previously received physiological data and media content indicating media content experiences may include records of media content and the associated physiological data of other users. The records of media content and the associated physiological data of other users may provide a baseline against which the physiological data of the user 550 can be compared to. For instance, the physiological data of the user 550 while experiencing the second media content which is the action film may be compared against the physiological data of other users who have experienced the action film. In this instance, a more prominent physiological response to the car-chase scene by the user 550 as compared to the physiological data of other users may indicate that the user 550 is have an above-average interest in car-chase scenes.

Depending on the amount of physiological data of other users available, the previously received physiological data and media content may be organized into groups according to demographics. For example, the physiological states of men and women in response to an action movie may be significantly different. In this case, comparing the physiological state of the user 550 in response to the action film and car-chase scene against the physiological responses of other users of the same gender may be more indicative than comparing the physiological response of the user 550 against the physiological responses of all users.

In an exemplary embodiment, the computing system 204 of the HMD 202 may have a record of physiological data associated with previous media content experienced by the user 550. In this case, the received physiological data and the received first media content may be analyzed against the record of physiological data associated with previous media content experienced by the user 550.

For instance, if the user 550 exhibited a consistent physiological state of stress or irritation while experiencing fast-paced thumping music in the past, an analysis may indicate that the user 550 dislikes fast-paced thumping music. The analysis may further indicate that the user 550 may not necessarily enjoy car-chase scenes based on the user 550 exhibiting insignificant changes in physiological state when experiencing car-chase scenes in the past. On the other hand, the user 550 may have exhibited in the past a consistent physiological state of excitement or engagement when experiencing media content showing a particular type of car also present in the car-chase scene, moving at high speeds. As such, the analysis may determine that the portion of the second media content corresponding to the change in physiological state of the user 550 is the presence of the particular type of car moving at high speeds, rather than the car-chase as a whole or the fast-paced thumping music. Once a portion of the media content corresponding to the physiological state is determined, the determined information may be stored and used for future determinations of correlations between received media content and physiological states in a similar fashion.

In some cases, the portion of the second media content that corresponds to the physiological state may include a subject of interest, such as a specific actor or, a particular car, or a certain discussion topic. In these cases, an eye-tracking sensor may be used to provide additional information for determining a portion of the second media content, and more specifically, a subject of interest if applicable. In an exemplary embodiment, the eye-tracking sensor may be a part of the sensor 222 of FIG. 3A. The eye-tracking sensor may be configured to measure the point of gaze or the motion of the eyes relative to the position of the head. In one example, the eye-tracking sensor may use video images of the eyes to track movement of the eyes and to determine the point of gaze of the eyes of the user 550.

As such, the eye-tracker sensor may provide eye-tracking data which may be used as a basis to determine a region of interest within the portion of the second media content that corresponds to the physiological state. In one example, the eye-tracker sensor on the HMD 202 may indicate that the user is looking towards a lower left direction relative to the position of the head during a moment while the video captured by the video camera 206 shows that the display of the media device 560 providing the second media content is present on the right half of the view of user 550. In this case, the user 550 may not be experiencing the second media content during the moment, and accordingly, no portion of the second media content corresponds to the physiological state of the user 550 during that moment.

In the example of the car-chase scene discussed above, more than one car may be shown moving at high speeds at a time. In this case, the eye-tracking data may indicate which of the more than one car in the car-chase scene the user 550 is looking at based on the particular region on the display of the media device 560 where the eyes of the user 550 were looking towards. In this case, the portion of the second media content corresponding to the physiological state of the user 550 may include a subject of interest which is the car shown in the particular region on the display where the eyes of the user 550 were looking towards.

This example may be further applied to determining an actor which may be the subject of interest included in the portion of the second media content corresponding to the physiological state of the user 550. In the case of the car-chase scene, the eyes of the user 550 may simply be drawn toward looking at where the on-screen action is, as opposed to looking at a car the user 550 is particularly interested in. On the other hand, in a scene where a number of actors are shown with mostly dialogue and minimal action, the eye-tracking data may indicate which actor the user 550 is looking at when determining the portion of the media content corresponding to the physiological state.

In a further example, the received first media content may indicate the user 550 is experiencing the second media content via an internet browser, such that the second media content is internet content. In one instance, the user 550 may be browsing through photos of people on a website, such as a social networking website, for example. In this case, the second media content may be a webpage of the photos. As such, the eye-tracking data may indicate which of the photos the user 550 is looking at when exhibiting a corresponding physiological state, as indicated by the received physiological data. In this case, depending on the photos and the exhibited physiological state, the subject of interest may be people in business outfits, for example.

In addition to browsing through photos on the social networking website, the user 550 may also exhibit corresponding physiological states when browsing through other internet content, such as blogs and news websites. While browsing through internet content, the user 550 may also exhibit a corresponding physiological state when the eye-tracking data indicates the user is looking at a particular blog post or news article. In this case, the subject of interest included in the portion of the second media content may be a certain topic discussed in the news article or blog post. This may also be extended to the user 550 exhibiting a corresponding response when viewing an ad on television or previews of upcoming feature films at a movie theater. Accordingly, the ad on television and the previews of upcoming feature films may each be a portion of the second media content corresponding to the physiological state of the user 550. In this case, the subject of interest may be a particular product or type of product being advertised in the television ad, and an upcoming feature film shown in the previews, respectively.

At block 608, the method 600 includes initiate a search for content of interest using the determined portion of the second media content that corresponds to the physiological state. In an exemplary embodiment, the search may be performed on a server, such as a cloud computing server, and initiating the search for content may include sending a request for information to the server.

Continuing with the example above relating to the car-chase scene, in which the portion of the media content corresponding to the physiological state is the presence of the particular type of car moving at high speeds, the initiated search for content of interest may include searches for other movies showing the particular type of car moving at high speeds. In another instance, the initiated search for content may include a search for content related to the subject of interest, which in this case may be the particular type of car. As such, the initiated search for content of interest may include a search for information on the particular type of car, such as make, model, zero-to-sixty time, maximum speed, or horsepower. In this case, the search for content of interest related to the subject of interest may further include searching for other cars similar to the particular type of car, such as cars from the same era, cars from the same country, or cars having similar zero-to-sixty times, maximum speed or horsepower.

In the case of an actor determined as the portion of the second media content that corresponds to the physiological state, the search for content of interest may include searching for other movies or television shows the actor is in. In the case the actor is determined to be the subject of interest, the search for content related to the subject of interest may include searching for statistics on the actor, such as full name, birthdate, weight, height, or marital status, etc. In an example, current and past photos of the actor or actress may also be searched for.

In the example of the user 550 browsing through photos provided on the social networking website, in which the second media content is the photos, the portion of the second media content corresponding to the physiological state of the user 550 may be the photos the user 550 was looking at when exhibiting the corresponding physiological state. As mentioned above, an example subject of interest in this case may be people in business outfits. In this case, the search for content of interest may involve searching for online profiles having photos of people in business outfits. If the corresponding physiological state indicates the user 550 has a favorable opinion of the photos of people in business outfits, the content of interest may include the profiles having such photos. On the other hand, if the corresponding physiological state indicates the user 550 has an unfavorable opinion of photos of people in business outfits, the content of interest may exclude the profiles having such photos.

In a similar case, the user 550 may be browsing through photos or profiles of friends on the social networking website. In this case, the search for content of interest may involve finding updated information on the friends, or additional photos of the friends. In another instance, the user 550 may exhibit a physiological state corresponding to a specific photo of the user 550 and the friends of the user 550 at a specific event or location. In this case, the second media content may be the photo of the user 550 and the friends of the user 550 at the specific event or location, and the specific event or location may be the portion of the second media content corresponding to the exhibited physiological state. As such, the search for content of interest may involve information on the specific event or location.

In this case, the portion of the second media content may also include a subject of interest which may be a specific friend in the specific photo. Accordingly, the content of interest related to the subject of interest may be an online profile page, contact information, or pictures of the specific friend.

In the case the user 550 exhibits a corresponding physiological state when experiencing a television commercial while watching television, the second media content may be the television program and the portion of the second media content corresponding to the physiological state exhibited by the user 550 may be the television commercial. As such, initiating the search for content of interest may involve first determining what the commercial is advertising and initiating a search for content of interest.

For example, the commercial may be an advertisement for a brand of cars. In this case, a search may be initiated to find other commercials for the brand of cars, or information on the brand. In the case that the portion of the second media content corresponding to the physiological state includes a subject of interest which may be a specific model within the brand of cars shown in the advertisement, initiating the search for content of interest may include initiating a search for information on the specific model.

At block 710, the method 600 includes display the content of interest. Once content of interest has been found according to the portion of the media content determined to correspond to the physiological state of the user 550, the content of interest may be received for displaying on a transparent, substantially transparent, or semi-transparent matrix display, such as lens elements 110 and 112 of the wearable computing device 100 or the display 208 of the HMD 202 of FIG. 3.

In an exemplary embodiment, the content of interest may be displayed at a location on the display depending on a location of the subject of interest within the second media content being experienced by the user 505 wearing the HMD 202. In this case, determining a location of the subject of interest within the second media content includes identifying a video image location in the first media content where the subject of interest from the second media content appears. The video image location of the subject of interest in the first media content may then be mapped to a display location on the display 208. As such, the content of interest may be displayed on the display 208 at the mapped display location, thereby augmenting the view of the subject of interest through the display 208.

In the example in which the subject of interest is an actor, the content of interest related to the actor may appear in the vicinity of the actor as viewed through the display 208, thereby augmenting the view of the actor. In one instance, the content of interest may follow the actor as the actor moves across the display 208. In a further example, content of interest for more than one subject of interest may be provided at the same time, as may be the case when more than one actor the user 550 enjoys are on screen at the same time. In this case, the corresponding content of interest for each actor may be displayed in the vicinity of the respective actors as viewed through the display 208.

In one example, the content of interest may be displayed immediately after receiving the content of interest. In another example, the computing device may display the content of interest at a later time. For instance, in the example of the car-chase scene discussed above, the content of interest may be displayed after the car-chase scene is over rather than during the car-chase scene. In another instance, the content of interest may be displayed after the user 550 has completed experiencing the media content, such as near the end of the movie. In these cases, the user 550 may be less unnecessarily distracted from experiencing the media content, than if the content of interest is displayed immediately upon being received.

To determine the later time at which to display the content of interest, the first media content may be analyzed to detect a portion of the second media content during which the content of interest should be displayed. In the example in which the second media content is the action movie with the car-chase scene, the first media content captured by the video camera 206 while the user 550 is experiencing the action movie may be analyzed to detect a portion of the action movie that is suitable during which to display the content of interest. For instance, analysis of the first media content may detect a portion of the action movie during which the physiological state of the user 550 indicates that the user 550 is less interested in the action movie, or even bored of the action movie. In one example, the analysis of the first media content may detect that physiological state of the user 550 indicates that the user is bored during a portion of the action movie after the car-chase scene when there is substantial dialogue and little action. As such, the content of interest may be displayed during this portion of the action movie.

In another example in which the user 550 is experiencing a second media content which is a television program, the portion of the second media content during which the content of interest is displayed may include a commercial break. In this case, the commercial break may be the next commercial break after the content of interest becomes available for display. In another case, the content of interest may be displayed only during commercials of the commercial break which are not associated with or does not contain the content of interest.

In a further example, the content of interest may not be displayed until the user 550 indicates a desire to view the content of interest. For example, a notification may be presented to the user 550 that content of interest is available, and the content of interest may be displayed only after the user 550 indicates the desire to view the content of interest. In an exemplary embodiment, the user 550 may indicate the desire to view the content of interest by pressing a button on the HUD 202 or by performing a gesture such as a predetermined movement of the eyes detectable by the eye-tracking sensor.

Displaying content of interest may further include prompting the user 550 to take action. In the example in which the corresponding physiological state of the user 550 indicates a favorable opinion of a photo on a social networking website, the content of interest may include profiles having similar photos, as previously discussed. In addition to displaying profiles having similar photos, the user 550 may be prompted to add the profiles to a list of favorites on a server of the social networking website. In another example, the user 550 may be prompted to contact a user whose profile the user 550 may find interesting. In this case, if the user 550 chooses to contact a user whose profile is interesting, the HUD 202 may send a request to the server of the social networking website to open a message box on the website through which the user 550 may contact the user whose profile is interesting.

Similarly, in the case the user 550 exhibits a corresponding physiological state when looking at a specific photo of the user 550 and friends at a specific event or location, the content of interest may include information on the specific event or location. In this case, displaying the content of interest may include prompting the user to schedule an event similar to the specific event or plan a trip to the specific location. Displaying the content of interest may further include prompting the user to contact the friends in the specific photo.

In the case the user 550 exhibits a corresponding physiological state when viewing a television commercial while experiencing a television program, the content of interest may include information on the product or service advertised, similar products or services, or coupons or discounts for the product and service advertised. In this case, displaying the content of interest may include prompting the user 550 to decide if the user 550 would like to send contact information to receive additional information about the product or service, or if the user 550 would like to schedule an appointment with a sales representative to discuss the product or service, for example.

In an exemplary embodiment of the present application, the method 600 may be performed iteratively. In one case, the content of interest displayed in block 610 may be considered a component of the received first media content in block 602. In this case, the physiological data received in block 604 may correspond to the content of interest component of the media content. In this example, the physiological state of the user 550 associated with the received content of interest may be used to determine if the content of interest found in the initiated search of block 608 is indeed of interest to the user 550. The physiological state of the user 550 associated with the received content of interest may further be used to hone in on a more specific portion of the content of interest corresponding to the physiological state of the user 550.

In some cases, the computing system 204 of the HMD 202 may not have the computing power to effectively or efficiently perform the steps of method 600. In this case, the HMD 202 may receive computing assistance from a remote device, such as the remote device 330 of FIG. 4. In an exemplary embodiment, the computing system 204 of the HMD 202 may perform portions of the different processing steps in methods 600, and may send the results of the completed portions along with the unprocessed physiological data and environmental content to the remote device 330 for more processing. In this case, the portions of the processing steps performed by the computing system 204 may depend on various factors such as a capability or an availability of the computing system 204. In another exemplary embodiment, the computing system 204 may coordinate the different input and output data while the remote device 330 performs the bulk of the analysis and data processing.

Figure 7:
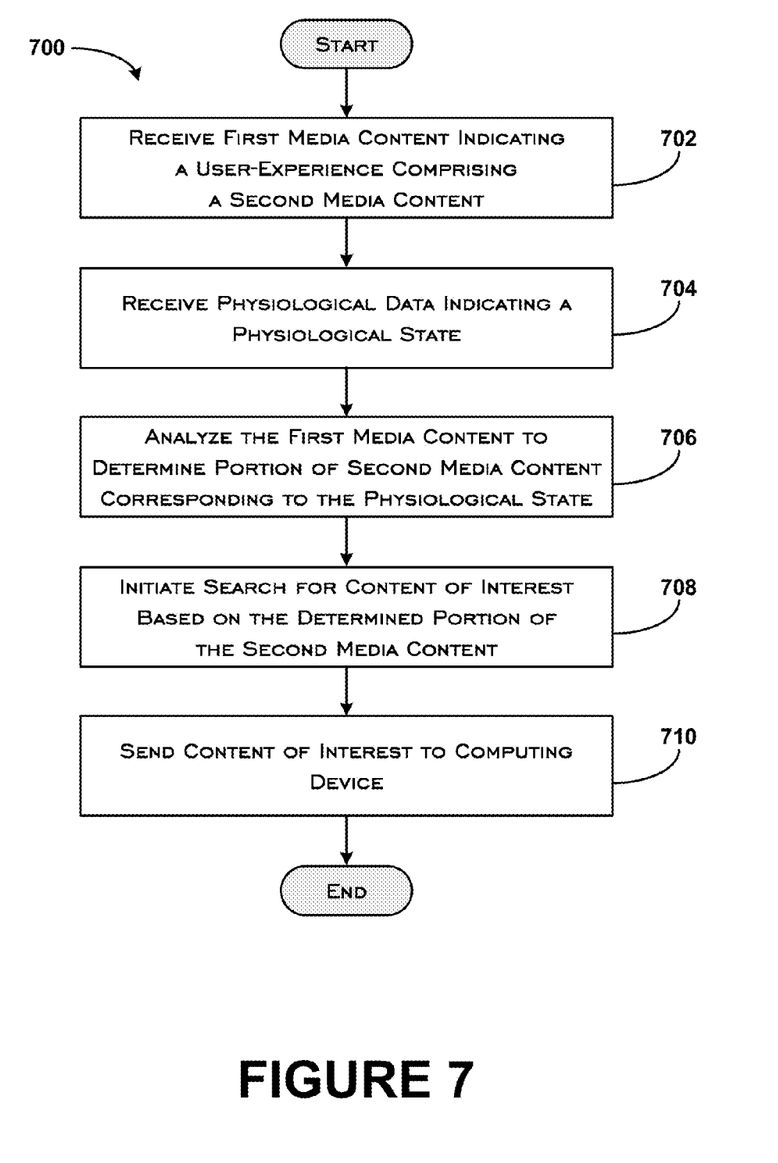
FIG. 7 is a block diagram of an alternate exemplary method for customizing a user experience.

FIG. 7 is a block diagram of an exemplary method 700 for customizing a user experience, according to one embodiment of the present application. Method 700 could be executed by the remote device 330 of FIG. 4, or another device or system altogether, such as a server system or cloud computing network. Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

At block 702, the method 700 includes receive first media content indicating a user-experience. In one example, the user-experience comprises a second media content, which may be from an external media device. Similar to block 602 of method 600, the first media content may be captured by the video camera 206 of the HMD 202, and the second media content may be media content provided by the media device 560 and experienced by the user 505 while the first media content indicating the user experience is being captured. In this case, the first media content may be received at a server system or the remote device 303 from the HMD 202 or the device 310.

At block 704, the method 700 involves receiving physiological data indicating a physiological state. Similar to block 604 of method 600, various types of sensors or combinations of sensors may be configured to acquire physiological data from the user 550, and the physiological data may indicate a physiological state of the user 550. In this case, the physiological data may be received at a server system or the remote device 303 from the HMD 202 or the device 310.

In an exemplary embodiment, the physiological data may be received while the physiological data continues to be detected by the various types of sensors or combinations of sensors, such as the sensor 222. In another case, the physiological data may be received at increments of time, or as significant changes in physiological data are present. In one example, the acquired physiological data may be received in the form it was detected by the sensors 222. In other words, the physiological data generated may be received in the "raw format" detected by the sensor 222. In another example, the received physiological data may have been processed after being detected by the sensor and before being received. For instance, a filter may be applied to the physiological to reduce signal noise before being received.

At block 706, the method 700 includes analyze the first media content to determine a portion of the second media content corresponding to the physiological state. Similar to block 606 of method 600, this analysis may be performed in response to receiving the physiological data indicating the physiological state at block 704.

At block 708, the method 700 includes initiate a search for content of interest using the determined portion of the second media content that corresponds to the physiological state. Similar to block 608 of method 600, the search may be performed on a different server, and initiating the search for content may include sending a request for information to the server. In one example, the remote device 330, server system, or cloud computing network executing method 700 may further perform at least part of the initiated search for content of interest.

At block 710, the method 700 includes send content of interest to computing device. The computing device may display the content of interest after receiving the content of interest similar to block 610 of method 600. In one example, the content of interest may be sent to the device 310 or HMD 202 whenever content of interest is found. In another example as discussed above in reference to block 610, an analysis of the first media may detect a portion of the second media content during which the content of interest should be displayed. In this case, the content of interest may be sent to the device 310 or HMD 202 for display during the detected portion of the second media content which the content of interest should be displayed.

Similar to method 600, the method 700 may be performed iteratively. In one case, the content of interest sent to the computing device or HMD for display in block 710 may be considered a component of the received first media content in block 702. In this case, the physiological data received in block 704 may correspond to the content of interest component of the media content. In this example, the physiological state of the user 550 associated with the received content of interest may be used to determine if the content of interest found in the initiated search of block 708 is indeed of interest to the user 550. The physiological state of the user 550 associated with the received content of interest may further be used to hone in on a more specific portion of the content of interest corresponding to the physiological state of the user 550.

4. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 8:
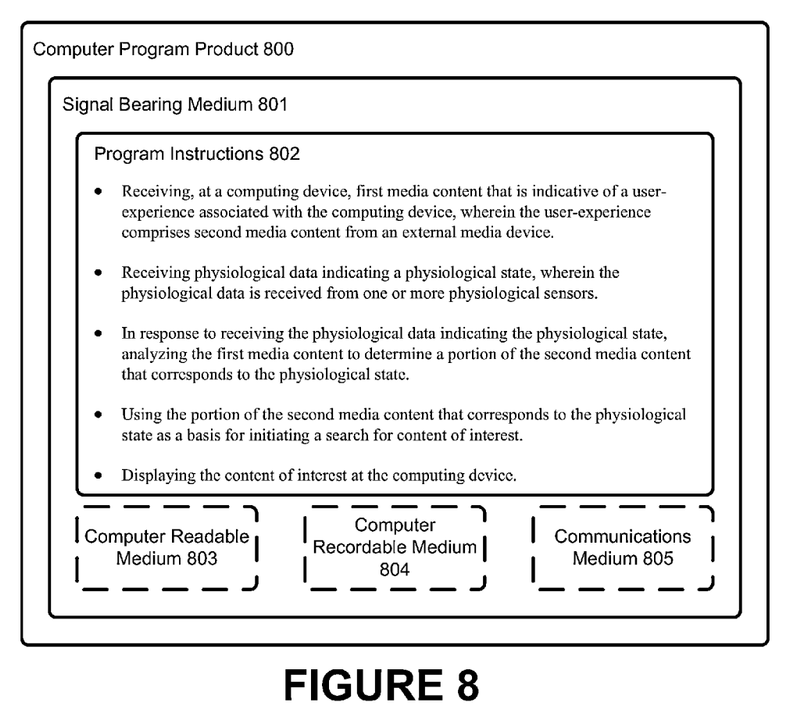
FIG. 8 is a schematic illustrating a conceptual partial view of an example computer program product.

In some embodiments, the disclosed methods may be implemented as computer program instructions encoded on a computer-readable storage media or tangible computer-readable storage media in a machine-readable format. FIG. 8 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more programming instructions 802 that, when executed by one or more processors, may provide functionality or portions of the functionality described above with respect to FIGS. 6-7. Thus, for example, referring to the embodiment shown in FIG. 6, one or more features of method 600 may be undertaken by one or more instructions associated with the signal bearing medium 801.

In some examples, the signal bearing medium 801 may encompass a tangible computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 202 of FIG. 3A may be configured to provide various operations, functions, or actions in response to the programming instructions 802 conveyed to the computing device 202 by one or more of the computer readable medium 803, the computer recordable medium 804, and/or the communications medium 805.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    capturing, with a camera coupled to a computing device, first media content that is indicative of a user-experience associated with the computing device, wherein the user-experience comprises second media content from an external media device;
    receiving physiological data indicating a physiological state, wherein the physiological data is received from one or more physiological sensors;
    in response to receiving the physiological data indicating the physiological state, analyzing the first media content to determine a portion of the second media content that corresponds to the physiological state;
    using the portion of the second media content that corresponds to the physiological state as a basis for initiating a search for content of interest; and
    displaying the content of interest at the computing device.

2. The method of claim 1, wherein the computing device comprises a wearable computing device having a head-mounted display (HMD).

3. The method of claim 2, wherein the HMD comprises a substantially transparent display.

4. The method of claim 1, wherein analyzing the first media content to determine a portion of the second media content that corresponds to the physiological state comprises analyzing one or more associations between previously received physiological data and previously received media content.

5. The method of claim 1, wherein analyzing the first media content to determining a portion of the second media content that corresponds to the physiological state comprises synchronizing the first media content and the physiological data.

6. The method of claim 1, further comprising:
further analyzing the first media content to detect a portion of the second media content during which the content of interest should be displayed; and
displaying the content of interest at the computing device in response to detecting the portion of the second media content during which the content of interest should be displayed.

7. The method of claim 6, wherein the second media content comprises a television program, and wherein the portion of the second media content during which the content of interest should be displayed comprises a next commercial break during the television program.

8. The method of claim 1, further comprising:
determining that the portion of the second media content that corresponds to the physiological state comprises a subject of interest; and
wherein initiating the search for content of interest comprises initiating a search for content related to the subject of interest.

9. The method of claim 8, wherein the computing device comprises a wearable computing device having a head-mounted display (HMD), the method further comprising:
using eye-tracking data associated with the HMD as a basis for determining a region of interest within the portion of the second media content that corresponds to the physiological state; and
identifying the subject of interest by determining that the subject of interest is located at or near the region of interest.

10. The method of claim 8, wherein the computing device comprises a wearable computing device having a head-mounted display (HMD), wherein the HMD comprises a substantially transparent display, the method further comprising:
determining a location of the subject of interest within the second media content; and
based on the location of the subject of interest, determining a display location in the substantially transparent display, such that displaying the content of interest at the display location augments a view of the subject of interest through the substantially transparent display.

11. The method of claim 1, wherein the physiological data is indicative of one or more of the following: (a) galvanic skin response, (b) pupillary response, (c) electrocardiographic response, (d) electroencephalographic response, (e) body temperature, (f) blood pressure, and (g) hemoglobin oxygenation response.

12. A method comprising:
receiving, at a server system, first media content that is indicative of a user-experience associated with a computing device, wherein the user-experience comprises second media content from an external media device and wherein the first media content was captured by a camera coupled to a head-mounted computing device;
receiving, at the server system, physiological data associated with the computing device, wherein, wherein the physiological data is indicative a physiological state;
in response to receiving the physiological data indicating the physiological state, analyzing the first media content to determine a portion of the second media content that corresponds to the physiological state;
using the portion of the second media content that corresponds to the physiological state as a basis for initiating a search for content of interest; and
sending the content of interest to the computing device.

13. The method of claim 12, wherein analyzing the first media content to determine a portion of the second media content that corresponds to the physiological state comprises analyzing one or more associations between previously received physiological data and previously received media content.

14. The method of claim 12, wherein analyzing the first media content to determine a portion of the second media content that corresponds to the physiological state comprises synchronizing the first media content and the physiological data.

15. The method of claim 12, further comprising:
determining that the portion of the second media content that corresponds to the physiological state comprises a subject of interest; and
wherein initiating the search for content of interest comprises initiating a search for content related to the subject of interest.

16. An article of manufacture including a tangible computer-readable media having computer-readable instructions encoded thereon, the instructions comprising instructions for performing the methods of:
capturing, with a camera coupled to a computing device, first media content that is indicative of a user-experience associated with the computing device, wherein the user-experience comprises second media content from an external media device;
receiving physiological data indicating a physiological state, wherein the physiological data is received from one or more physiological sensors;
in response to receiving the physiological data indicating the physiological state, analyzing the first media content to determine a portion of the second media content that corresponds to the physiological state;
using the portion of the second media content that corresponds to the physiological state as a basis for initiating a search for content of interest; and
displaying the content of interest at the computing device.

17. An article of manufacture including a tangible computer-readable media having computer-readable instructions encoded thereon, the instructions comprising instructions for performing the methods of:
receiving, at a server system, first media content that is indicative of a user-experience associated with a computing device, wherein the user-experience comprises second media content from an external media device and wherein the first media content was captured by a camera coupled to a head-mounted computing device;
receiving, at the server system, physiological data associated with the computing device, wherein, wherein the physiological data is indicative of a physiological state;
in response to receiving the physiological data indicating the physiological state, analyzing the first media content to determine a portion of the second media content that corresponds to the physiological state;
using the portion of the second media content that corresponds to the physiological state as a basis for initiating a search for content of interest; and
sending the content of interest to the computing device.

18. A device comprising:
a processor; and
memory including instructions stored therein executable by the processor to perform functions comprising:
capturing, with a camera coupled to a computing device, first media content that is indicative of a user-experience associated with the computing device, wherein the user-experience comprises second media content from an external media device;

receiving physiological data indicating a physiological state, wherein the physiological data is received from one or more physiological sensors;

in response to receiving the physiological data indicating the physiological state, analyzing the first media content to determine a portion of the second media content that corresponds to the physiological state;

using the portion of the second media content that corresponds to the physiological state as a basis for initiating a search for content of interest; and displaying the content of interest at the computing device.

19. A device comprising:

a processor; and memory including instructions stored therein executable by the processor to perform functions comprising:

receiving, at a server system, first media content that is indicative of a user-experience associated with a computing device, wherein the user-experience comprises second media content from an external media device and wherein the first media content was captured by a camera coupled to a head-mounted computing device;

receiving, at the server system, physiological data associated with the computing device, wherein, wherein the physiological data is indicative of a physiological state;

in response to receiving the physiological data indicating the physiological state, analyzing the first media content to determine a portion of the second media content that corresponds to the physiological state;

using the portion of the second media content that corresponds to the physiological state as a basis for initiating a search for content of interest; and sending the content of interest to the computing device.

* * * * *

UNITED STATES PATENT AND TRADEMARK OFFICE
CERTIFICATE OF CORRECTION

| | | |
|---|---|---|
| PATENT NO. | : 8,994,613 B1 | Page 1 of 1 |
| APPLICATION NO. | : 13/345493 | |
| DATED | : March 31, 2015 | |
| INVENTOR(S) | : Michael Johnson et al. | |

It is certified that error appears in the above-identified patent and that said Letters Patent is hereby corrected as shown below:

In the Claims

In Column 21, line 58, delete "wherein,"

In Column 21, line 59, insert --of-- after indicative

Signed and Sealed this
Twenty-first Day of July, 2015

Michelle K. Lee
*Director of the United States Patent and Trademark Office*